Sept. 1, 1964 A. W. DREYFOOS 3,147,366
TEMPERATURE CONTROLLED PHOTOGRAPHIC PROCESSOR
Filed Feb. 5, 1962
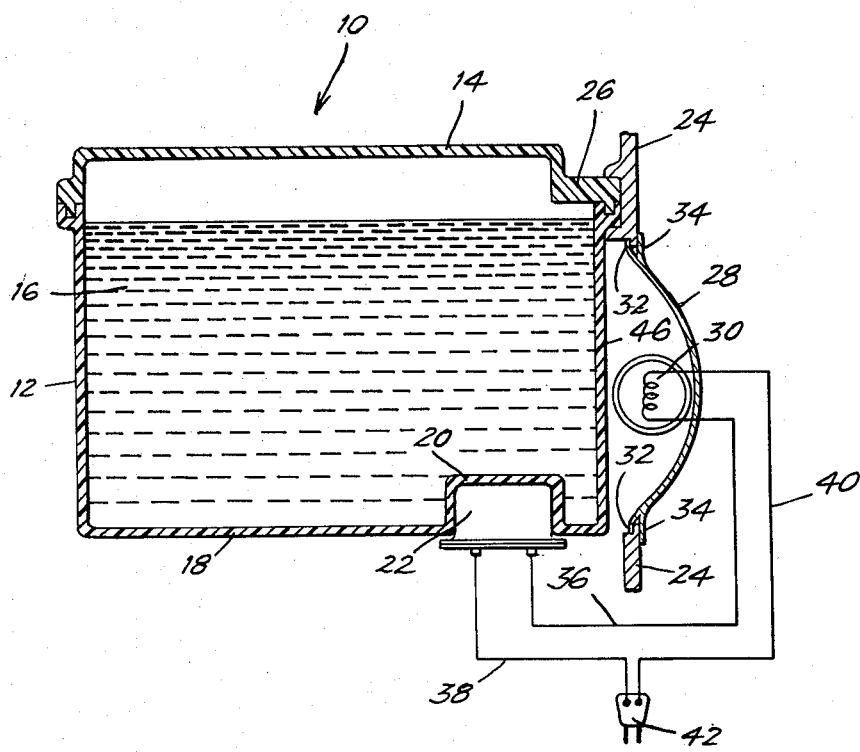
INVENTOR
Alex W. Dreyfoos,
BY Diggins + LeBlanc
ATTORNEYS

United States Patent Office 3,147,366
Patented Sept. 1, 1964

3,147,366
TEMPERATURE CONTROLLED PHOTOGRAPHIC PROCESSOR
Alex W. Dreyfoos, 20 Eagles Bluff, Port Chester, N.Y.
Filed Feb. 5, 1962, Ser. No. 170,885
10 Claims. (Cl. 219—335)

This invention relates to a remote acting temperature control system and more particularly to a control system for use in photographic film or paper processing machines and in other devices where it is desired to remotely control the temperature in an enclosed tank or housing.

Ideally, a photographic processor is made so that its light tight processing tank or tanks are removable from its drive motor for cleaning and filling with processing solution. For this reason, it is desirable to have the tank assembly suitable for complete water immersion. Often, such tank assemblies are made of plastic because of its low cost and excellent chemical resistance.

The current trend in photographic processing is towards higher solution temperatures and heretofore it has been found that obtaining and retaining elevated solution temperatures in light tight removable and submergeable processing tanks presents serious difficulties. A simple temperature control system typically requires an electric heater, a thermostat and a source of electric power. If the heater and thermostat are built into the processing tank, it is necessary that they be protected from chemical corrosion and that the heater be removable or suitable for complete immersion in water. These provisions are expensive, inconvenient and, in the case of the immersible type unit, pose an electric shock hazard. If the heater is provided outside the tank, there is difficulty because of the insulating properties of plastic in rapidly transferring the heat to the chemical solutions without overshooting the desired temperature.

Generally, the known heaters have heated by convection or conduction so that the heat transfer surface was usually hotter than the desired temperature. Under such circumstances, when the energy is cut off, the heat transfer surface continues to supply heat until the temperature of the heat transfer surface cools to the solution temperature. As a result, the heating system overshoots and tends to "hunt" about the desired temperature.

The present invention avoids the above-mentioned difficulties by providing a novel system utilizing infra-red radiation as the source of heat for the chemical solution. The heat source is provided externally of the tank and the radiant heat energy passes instantly through the plastic walls of the tank to heat its contents. Similarly, when the radiant heat source is turned off, heating stops immediately, thus avoiding overshooting the desired temperature. Through this arrangement, the tank can be maintained light tight with respect to the actinic radiation and may be completely removable from the heat source and control element or thermostat for complete immersion in a water bath.

It is therefore a primary object of the present invention to provide a novel temperature control system.

Another object of the present invention is to provide a remote acting temperature control system.

Another object of the present invention is to provide a temperature control system for photographic processing solutions.

Another object of the present invention is to provide a temperature control system for containers that are light tight with respect to actinic radiation.

These and further objects and advantages of the invention will be more apparent upon reference to the following specification, claims and appended drawings wherein the single figure of the drawing illustrates the novel control system of the present invention as applied to a photographic processing tank.

Referring to the drawing, the processing tank of the present invention generally indicated at 10 comprises a lower portion or container 12 and a cover 14 removably secured to the top of the container. The processing tank is at least partially filled with a chemical processing solution 16 which may be a developer or the like for processing photographic film or photographic emulsion prints. Suitable apparatus (not shown) may be provided for feeding film or paper through the tank or the film or prints may be simply placed on a reel or hanger and placed in the tank before the cover 14 is put into place.

When filled with solutions, processing tank 10 is placed on a stand consisting of a conventional control unit or thermostat 22, lamp 30, reflector 28 and guides 24.

Base 18 of container 12 is provided with a thin wall cavity 20 which is in contact with the thermostat 22 so as to be in close proximity to the processing solution 16 so that it is subject to approximately the same temperature variations as the processing solutions.

The side wall 46 of the processing container 12 has a flat surface which lies adjacent to the lamp 30 and reflector 28 so as to receive substantially all of the lamp radiation when in position for processing. Reflector 28 is provided with a plurality of resilient spring fingers such as 32 and 34 embracing suitable flanges on guides 24.

Control unit 22 is preferably provided with a black coating or black exterior and reflector 28 is focused on the thermostat so that if the heater is energized with no solution in the tank, the thermostat overheats very rapidly and cut-off occurs almost instantaneously.

Infra-red lamp 30 is connected in series with thermostat 22 by means of leads 36, 38 and 40. The lamp is energized from any suitable electric source such as a plug 42 insertable into a convenient 110-volt A.C. household outlet.

Lamp 30 may be any of the well known infra-red radiating sources, such as a conventional type heat lamp. The filaments of infra-red lamps are generally operated at a relatively low temperature and can be made to produce maximum radiation in the region of 1 to 2.5 micron wave length. The reflector directs the radiated energy into the processing tank 10.

Tank 10 is made of a suitable material which is opaque to visible light so as to completely block out any visible light from the interior of the tank. At the same time, the material of the tank or at least the wall of the container 12 adjacent infra-red source 30 is transparent to radiation in the infra-red region, preferably from 1 to 3 microns wave length. In the preferred embodiment, the entire tank including the container 12 and cover 14 is made of plastic meeting these requirements.

By way of example only, the material forming the tank 12 may be of plastic referred to as Plexiglas V LC-1697-B black opaque, manufactured by the Rohm and Haas Company of Philadelphia, Pennsylvania. This plastic is made by conventional techniques from a polymethyl methacrylate molding powder using an organic phthalocyanine pigment and a soluble anthraquinone dye. This plastic is opaque to visible light but readily transmits radiation of from about 0.8 to about 2.2 micron wave lengths. These limits are not critical from the standpoint of operativeness of the invention but appear to be inherent in the plastic materials. Other suitable materials meeting these requirements may be used and, instead of being dispersed throughout the plastic material, it is apparent that the dye may be coated onto the surface of the plastic. The essential requirements are that the tank adjacent the infra-red source 30 be opaque to actinic radiation but readily transmit radiation in the longer wave length region so as to enable the infra-red rays to heat the solution 16 within the tank without at the same time obstructing the photographic processing operation by permitting access of actinic light to the interior of the tank. Actinic radiation is used to mean any radiation to which the photographic materials being processed are sensitive, including visible light and radiant energy outside the visible spectrum.

In operation, the tank is prepared by partially filling it with a processing solution 16 and closing the cover 14 over the top of the tank with suitable sealing if desired to completely block out the visible light. The plug 42 is then inserted into a wall socket to energize lamp 30 so as to bring solution 16 up to operating temperature. When the desired temperature has been reached, it is sensed by the thermostat 22 which is actuated to break the circuit to lamp 30. At a predetermined lower temperature, the thermostat is subsequently actuated to again close the circuit to lamp 30 so as to bring the solution back up to the desired temperature in a well known manner. Because of the close proximity of the thermostat 22 to the processing solution 16, the thermostat undergoes temperature variations closely corresponding to those of solution 16. The tank is then ready for either manual or automatic insertion of the material to be processed.

It is apparent from the above that the present invention provides a novel temperature control system for visible light tight containers and particularly photographic processing baths through the use of infra-red radiation from an external source. While described in conjunction with its use in photographic processing, it is apparent that the temperature control system is applicable to all types of devices where it is desirable to remotely control the temperature in a tank or container.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A photographic processor comprising a visible-light-tight processing solution container having at least a portion thereof transparent to infra-red radiation, means for heating the solution to and retaining it at a selected elevated temperature comprising, an infra-red heat source positioned exteriorly of and adjacent said transparent portion for heating the interior of said container, and thermostatic means positioned in heat exchange relationship to the container and within the path of radiations from said infra-red heat source for controlling said heat source in response to temperature variations within said container.

2. A system according to claim 1 wherein said container is made of plastic.

3. A photographic processor comprising a visible-light-tight processing solution container having at least a portion thereof transparent to radiations in approximately the 1 to 3 micron range, means for heating the solution to and retaining it at a selected elevated temperature comprising, an infra-red lamp positioned adjacent to the transparent portion of said container for heating the processing solution, a source of electrical energy for said lamp, and thermostatic means fitted within a recess in said container and positioned in the path of radiations emitted from said lamp for controlling energization of said lamp in response to temperature variations within said container.

4. A system according to claim 3 wherein said container is plastic.

5. A system according to claim 4 wherein said container is made of polymethyl methacrylate containing a black dye.

6. A photographic processor comprising a visible-light-tight plastic processing solution container having a bottom and side walls transparent to infra-red radiation said bottom being formed with a cavity adjacent one side wall, means for heating the solution to and retaining it at a selected elevated temperature comprising, an infra-red heat lamp mounted adjacent said side wall of said container, electrical means for energizing said lamp, and thermostat means within said cavity and positioned within the path of radiations from said infra-red lamp for controlling the energization of said lamp in response to temperature variations of the solution within said container.

7. A photographic processor comprising a visible-light-tight plastic processing solution container transparent to infra-red radiation, having a bottom and integral side walls, a cavity formed in the bottom adjacent one side wall of the container, means for heating the solution to and retaining it at a selected elevated temperature comprising, an infra-red heat lamp mounted exteriorly of and adjacent said side wall of said container for heating the interior of said container, electrical means for energizing said lamp, and thermostat means mounted within said cavity and positioned within the path of radiations from said lamp for controlling the energization of said lamp in response to temperature variations within said container.

8. A system according to claim 7 wherein said lamp is provided with a reflector for focusing the heat energy from said lamp on said thermostat.

9. A system according to claim 7 wherein said container is made of polymethyl methacrylate containing a black dye.

10. A system according to claim 9 wherein said polymethyl methacrylate is made with an organic phthalocyanine pigment and a soluble anthraquinone dye.

References Cited in the file of this patent

UNITED STATES PATENTS

| | | |
|---|---|---|
| 884,922 | Hayden | Apr. 14, 1908 |
| 2,177,101 | Franzwa | Oct. 24, 1939 |
| 2,666,979 | Van Dusen | Jan. 26, 1954 |
| 2,785,623 | Graham | Mar. 19, 1957 |
| 2,823,902 | Reynolds | Feb. 18, 1958 |
| 2,954,826 | Sievers | Oct. 4, 1960 |
| 3,067,667 | Krehbiel | Dec. 11, 1962 |